INVENTORS
RICHARD L. GOLDEN
JOHN P. SCHMIDT
BY
Barry Evans
ATTORNEY

INVENTORS
RICHARD L. GOLDEN
JOHN P. SCHMIDT
BY

Barry Evans

ATTORNEY

United States Patent Office 3,452,055
Patented June 24, 1969

3,452,055
PROCESS FOR THE RECOVERY OF EPOXIDES WHEREIN ALKYLAROMATIC COMPOUND IS REMOVED IN TWO DISTILLATION ZONES
Richard L. Golden, Oradell, N.J., and John P. Schmidt, New York, N.Y., assignors to Halcon International, Inc., a corporation of Delaware
Filed July 29, 1966, Ser. No. 568,873
Int. Cl. C07d 1/08; B01d 3/14
U.S. Cl. 260—348.5                                    8 Claims

ABSTRACT OF THE DISCLOSURE

In a process for the epoxidation of olefins with an alkylaromatic hydroperoxide, the steps of recovery and recycle of compounds in the epoxidation effluent which comprise: (1) removing olefin and epoxide from said effluent (2) removing in a first distillation zone from 70 to 98 percent of the alkylaromatic compound contained therein (3) removing the epoxidation catalyst from the remaining compounds by vaporizing said remaining compounds from the catalyst (4) distilling the vapor of step (3) in a second distillation zone to remove the remainder of the alkylaromatic compound.

---

This invention relates to a process for the manufacture of epoxides. More specifically it relates to a process wherein olefins are epoxidized using, as the source of oxygen, the hydroperoxides of alkylaromatic compounds. Even more specifically the invention relates to a novel scheme for the recovery of the alkylaromatic compounds, from the by-products of the epoxidation.

It is known in the art to epoxidize olefins using as the oxygen donor the hydroperoxide of an alkylaromatic compound. Propylene oxide, for example, may be produced by epoxidizing propylene with ethylbenzene hydroperoxide or cumene hydroperoxide. The ethylbenzene or cumene hydroperoxides are reduced in the course of the epoxidation, to alpha-phenyl ethanol or dimethyl phenyl carbinol respectively.

In the first step, the alkylaromatic compound is oxidized using oxygen; preferably the source of the oxygen is air. The oxidation of the alkylaromatic compound can be carried out to conversions of up to 40% with high selectivity. The resulting oxidation mixture contains the starting alkylaromatic compound and the hydroperoxide resulting from the oxidation. It also contains very minor amounts of by-products.

Introduction of propylene or other higher olefins into this mixture (or a concentrate thereof), in the presence of a molybdenum or equivalent catalyst results in the production of propylene oxide or other higher olefin oxides. In the epoxidation step, the alkylaromatic oxidate is combined with a stream comprising olefin and a solution of catalyst. The catalyst is preferably a compound of Mo, Ti, Ta, W, Re, Se, or Nb. The alkylaromatic hydroperoxide is converted into the corresponding alkylaromatic alcohol and small amounts of alkylaromatic ketone. The olefin is converted into its epoxide and can be separated from the mixture of other compounds by the process of distillation.

The stream from which epoxide has been removed contains alkylaromatic compound which was unconverted in the initial oxidation step, alkylaromatic alcohol and ketone which are the reduction products of the hydroperoxide, catalyst and trace amounts of other by-products. It is desired to recycle the alkylaromatic compound to the initial oxidation step, recycle the catalyst of the epoxidation step and recover the alkylaromatic alcohol for use as a separate by-product or for further processing.

One process alternate of substantial importance in this regard involves the dehydration of the alcohol to produce the unsaturated alkylaromatic compound. For example, alpha phenyl ethanol, the reduction product of ethylbenzene hydroperoxide, may be dehydrated by known techniques to form styrene. Similarly the alcohol formed by the reduction of cumene hydroperoxide can be dehydrated to form alpha methyl styrene.

Figure 1:
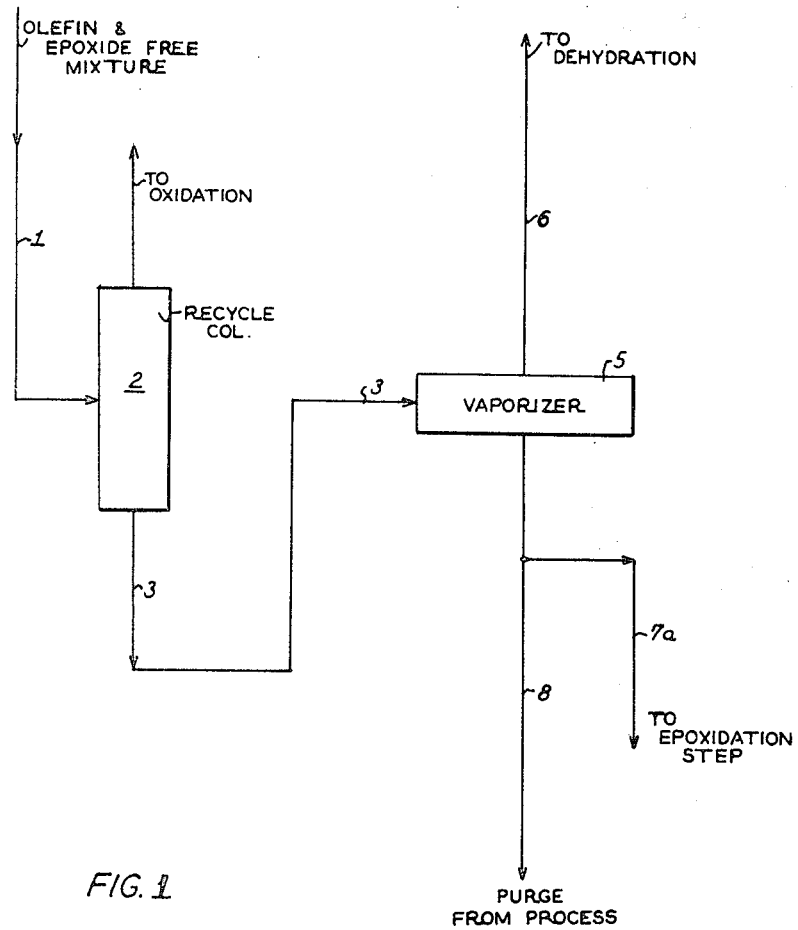
Figure 2:
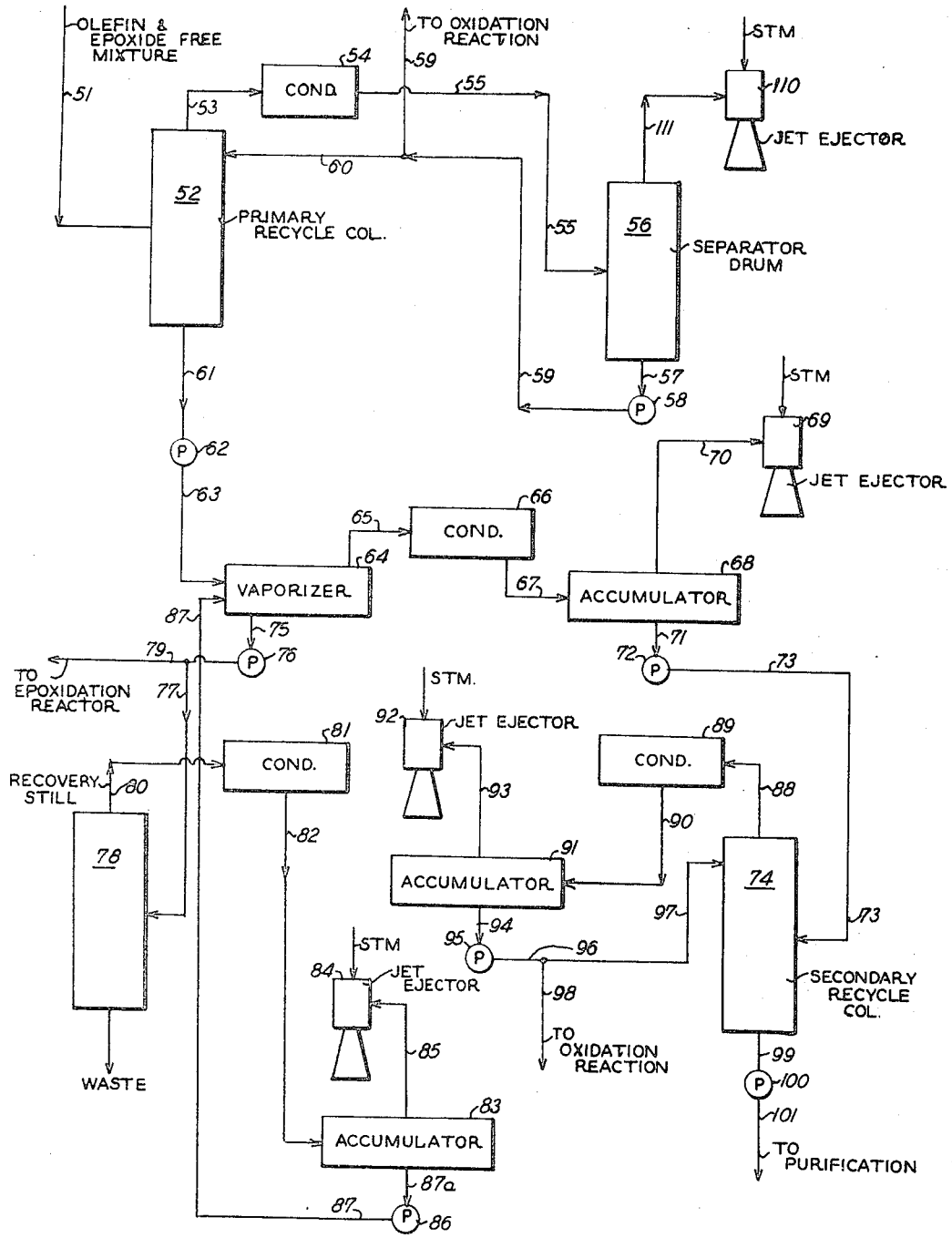

Heretofore the several components in the olefin and epoxide-free epoxidizer effluent were separated as shown in FIGURE 1. The stream comprising the olefin and epoxide-free material and catalyst passed via line 1 to recycle column 2. From recycle column 2 a distillate alkylaromatic compound was recovered. This stream was water washed and recycled to the initial oxidation step for hydroperoxide production. The bottoms stream from recycle column 2 was removed via line 3. This stream comprised alcohol, ketone, catalyst and some heavier materials.

This stream passed via line 3 to vaporizer 5 wherein most of the alcohol and ketone were vaporized before passing to the dehydration step via line 6. The non-vaporized stream was removed via line 7 from the vaporizer. This stream comprising catalyst and some heavier materials was in part recycled to the epoxidation step via line 7a and in part purged from the process via line 8. The alcohol stream from the vaporizer was then dehydrated to form the corresponding unsaturated alkyl aromatic compound.

It was found that although this process was effective to separate the several components substantial amounts of alcohol were lost in the recycle column, by means of dehydration to olefin and subsequent polymerization.

It is therefore a purpose of this invention to provide a process whereby the alkylaromatic compound can be recovered and recycled to the oxidation step without loss of the valuable alcohol by-product.

It is another purpose of this invention to provide an economical separation scheme whereby the alcohol by-product is not subjected to conditions in the recycle operation which cause dehydration to unsaturated compounds and subsequent polymerization of these compounds.

It was discovered that these problems of material loss could be substantially eliminated if the recycle process were altered as shown in FIGURE II. The alkylaromatic compound removal is now removed in two distillation zones; the final separation takes place after catalyst and heavy ends are removed from the process.

The olefin and epoxide-free mixture passes via line 51 to primary recycle column 52. The overhead from this column is removed via line 53, is condensed in condenser 54 and passes via line 55 to separator drum 56. A vacuum is maintained on the primary recycle column via jet ejector 110 which is attached to separator drum 56 via line 111. The overhead stream which is essentially pure alkylaromatic compound is recycled via line 57, pump 58 and line 59 to the initial alkylaromatic oxidation step. Another stream of overhead passes via line 60 as reflux to primary recycle column 52.

Only a portion of the alkylaromatic compound is removed in the primary recycle column. The remainder passes with the alcohol, ketone, catalyst and heavier materials in the bottoms stream via line 61 to pump 62 and passes thereafter via line 63 to vaporizer 64. In vaporizer 64 all of the remaining hydrocarbon and substantially all of the alcohol and ketone are vaporized. The vapors pass via line 65 to condenser 66 and the condensate then passes via line 67 to accumulator 68. A vacuum is maintained on the vaporizer system by means of vacuum ejector 69 which is connected to accumulator 68 via line 70.

The condensate passes via line 71 to pump 72 and therefrom passes via line 73 to secondary recycle column 74.

The non-vaporized materials from vaporizer 64 which are comprised of catalyst, heavier materials and small amounts of alcohol and ketone pass via line 75 to pump 76. They then pass via line 77 to recovery still 78. A portion of this stream is recycled directly to the epoxidation reactor via line 79.

In purge recovery still 78 the catalyst is again subjected to a heating in order to drive off residual amounts of reclaimable alcohol and ketone. These vapors pass via line 80 to recovery condenser 81 where they are condensed. The condensate passes via line 82 to accumulator 83. The vacuum on the system is maintained via jet ejector 84 which is attached to accumulator 83 via line 85. The condensed alcohol-ketone material passes via line 87a to pump 86 and from there is recycled via line 87 to vaporizer 64.

In secondary recycle column 74 the remaining alkylaromatic compound is removed as an overhead product. The vapors are removed from secondary recycle column 74 via line 88 and are condensed in condenser 89. The condensate passes via line 90 to accumulator 91; the vacuum on the secondary recycle column is maintained by jet ejector 92 which is connected to accumulator 91 via line 93. The condensed alkylaromatic compound passes via line 94 to pump 95.

A portion of the recovered alkylaromatic compound is used as reflux to the secondary recycle column and passes via lines 96 and 97 to the upper part of that column. The remainder passes via lines 96 and 98 to the initial oxidation step. The bottoms from the secondary recycle column which are comprised of alkylaromatic alcohol and ketone pass via line 99 to pump 100 and then via line 101 to purification steps prior to storage or dehydration into the unsaturated alkylaromatic compound.

The following example demonstrates the considerable yield advantage of the two column recycle process over the one column recycle process. The alkylaromatic compound involved is ethylbenzene and the corresponding alcohol is alpha phenyl ethanol.

EXAMPLE I

In the following tables the stream numbers refer to the stream numbers on FIGURES I and II. All flow rates are in pounds per hour.

ONE COLUMN PROCESS

| Figure 1 stream No. | 1 | 3 | 6 | 7 |
|---|---|---|---|---|
| Ethylbenzene | 150,000 | 100 | 100 | 0 |
| Alpha phenyl ethanol | 20,000 | 19,550 | 18,910 | 600 |

Recycle column 2 conditions: reboiler temperature 145° C., 15 minute holdup time.

TWO COLUMN PROCESS

| Figure II stream No. | 51 | 59 | 61 | 73 | 79 | 98 | 99 |
|---|---|---|---|---|---|---|---|
| Ethylbenzene | 150,000 | 135,000 | 15,000 | 15,000 | 0 | 14,930 | 70 |
| Alpha phenyl ethanol | 20,000 | 0 | 19,965 | 19,365 | 600 | 0 | 19,325 |

Primary recycle column 52 conditions: reboiler temperature 115° C., 15 minute holdup time; secondary recycle column 74: reboiler temperature 150° C., 15 minute holdup time.

The foregoing example shows that the loss of alpha phenyl ethanol in the one zone system is 490 lbs. per 20,000 lbs. of fresh alpha phenyl ethanol or 2½%. The loss of alpha phenyl ethanol in the two zone system is 75 lbs. or about 0.4%.

Presumably, the loss of alcohol in the single column system occurs in the bottom of the recycle column. The alcohol in the presence of epoxidation catalyst at high temperatures dehydrates and forms the unsaturated alkylaromatic compound. The unsaturated alkylaromatic compound, (for example, styrene) will partly degrade to polymer in the bottoms of the recycle column and partly pass overhead with the alkylaromatic compound being recycled. It will then be lost to the process by formation of either polymer or other heavier by-products.

By removing only a portion of the alkylaromatic compound in the primary recycle column it is possible to maintain lower temperatures and more dilute catalyst concentrations in the bottom of that column. Where the alcohol is ultimately subjected to high temperatures, in the bottom of the secondary recycle column, it is already free of catalyst and consequently will not undergo the high rates of dehydration as have been experienced in the single column system.

The hydroperoxides used in epoxidation reactors and in this invention are derived from alkylaromatic hydrocarbons having at least one hydrogen atom on a carbon adjacent to the ring. The aromatic ring may be that of benzene or naphthalene and may be substituted with fluoro, chloro, bromo, nitro, alkoxyl, acyl or carboxy (or esters thereof) groups. The ring may have one or more side chains with up to twelve carbon atoms in each chain. The chains may be branched. Examples are the hydroperoxides of toluene, ethylbenzene, cumene, p-ethyltoluene, isobutylbenzene, tetralin, diisopropylbenzene, diisopropyltoluene, o-xylene, m-xylene, p-xylene, phenylcyclohexene, and the like. The preferred species are those derived from cumene and ethylbenzene.

Most preferably, in the present invention the hydroperoxides are prepared through oxidation of the alkylaromatic hydrocarbon. The oxidation is carried out using molecular oxygen as provided by air although pure oxygen as well as oxygen in admixture with inert gas in greater or lesser concentrations than air can be used. Oxidation temperatures broadly in the range of 40 to 180° C. preferably 90 to 140° C. and pressures in the range 15 to 1000 p.s.i.a. and preferably 30 to 150 p.s.i.a. can be used. The oxidation is continued until about 1 to 70% and preferably about 10 to 50% of the alkylaromatic compound has been converted to its hydroperoxide.

Various additives of known type can be employed during the alkylaromatic oxidation to promote hydroperoxide production.

The hydrocarbon oxidation effluent comprises a solution of the hydroperoxide in hydrocarbon along with some alcohol formed during the oxidation. This effluent can be employed in the epoxidation without concentrating the hydroperoxide, or the oxidation effluent can be distilled to first concentrate the hydroperoxide.

The epoxidation using the alpha aralkyl hydroperoxide is carried out in the presence of epoxidation catalysts which may be compounds of the following: Ti, Se, Cr, Zr, Nb, Ta, Te, U, Mo, W and Re. The preferred catalysts are compounds of Mo, Ti, Ta, W, Re, Se and Nb.

The amount of metal in solution used as catalyst in the epoxidation process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_3O_3$, $MoO_3$, molybdic acid, and molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent, depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for examples, as aceto-acetonates may also be used. Specific and preferred catalytic compounds of this type for use in the invention are the naphthenates and carbonyls of molybdenum, vanadium, titanium, tungsten, rhenium, niobium, tantalum and selenium. Alkoxy compounds such as tetrabutyl titanate and others like alkyl titanates are very useful.

Olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl vinyl toluene, vinyl cyclohexene, the phenyl cyclohexenes, and the like. Olefins having halogen, oxygen, sulphur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers.

The lower olefins having about 3 or 4 carbon atoms in an aliphatic chain are advantageously epoxidized by this process. The class of olefins commonly termed alpha olefins or primary olefins are epoxidized in the particularly efficient manner by this process. It is known to the art that these primary olefins, e.g., propylene, butene-1, decene-1, hexadecene-1, etc. are much more difficulty epoxidized than other forms of olefins, excluding only ethylene. Other forms of olefins which are much more easily epoxidized are substituted olefins, alkenes with internal unsaturation, cycloalkenes and the like.

The effluent from the epoxidation reactor contains from 10 to 70 mol percent alkylaromatic compound, from 0.5 to 10 mol percent alkylaromatic alcohol, and lesser amounts of alkylaromatic ketone and catalyst. In the primary recycle column, from 70 to 98 percent of the alkylaromatic compound should be removed as an overhead product. Better results are obtained if from 80 to 95 percent of the alkylaromatic compound in the distillation column feed is removed and best results are obtained if from 85 to 92 percent of the alkylaromatic compound in the feed is removed.

The primary recycle column can be operated at an overhead pressure of from 0.1 to 14.7 p.s.i.a. Better results are obtained if the pressure is maintained at from 0.3 to 3 p.s.i.a. and best results are obtained if the pressure is maintained at from 1 to 2.5 p.s.i.a.

More important in the operation of this column is the bottoms temperature. To minimize dehydration of the alcohol in the bottom of this column it is necessary to limit the bottoms temperature to about 140° C. Better results are obtained, however, if the temperature is maintained below about 125° C. and best results are obtained if the temperature is maintained at about 115° C. or less.

The operation of the vaporizer must also be carefully controlled to minimize dehydration of the alcohol and loss of raw material values. The temperature in the vaporizer is critcal; it should not exceed 140° C. and desirably should be less than 125° C. and even more desirably should be less than 120° C.

The purge recovery still must be operated at absolute minimum pressure. Good results are obtained if the pressure is less than 5 mm. Hg and even better results are obtained if the pressure is about 1 mm. Hg.

In the second recycle column wherein the remaining alkylaromatic compound is removed from the catalyst-free mixture of alkylaromatic, alcohol and ketone, the operating pressure can be from 5 to 300 mm. Hg. The bottoms temperature of the secondary recycle column is the crucial variable and should not be in excess of 220° C. Best results are obtained if it is less than 170° C.

In view of the foregoing disoclosures, variations and modifications thereof will be apparent to one skilled in the art, and it is intended to include within the invention all such variations and modifications except as do not come within the scope of the appended claims.

What is claimed is:

1. In a process for the epoxidation of olefins wherein the oxygen donor is the hydroperoxide of an alkylaromatic compound which is substantially converted into alkylaromatic alcohol, the steps of recovery and recycle of compounds in the epoxidation effluent which comprise the steps of: (1) removing substantially all unconverted olefin and epoxide from the epoxidation effluent; (2) removing in a first distillation zone from 70 to 98 percent of the alkylaromatic compound contained therein; (3) removing the epoxidation catalyst from the remaining compounds by vaporizing said remaining compounds from the epoxidation catalyst; and (4) distilling the vapor from step (3) above in a second distillation zone to remove the remainder of the alkylaromatic compound from by-product alkylaromatic alcohol.

2. A process as recited in claim 1 wherein the alkylaromatic compound is ethylbenzene, and the by-product is alpha phenyl ethanol.

3. A process as recited in claim 1 wherein the primary distillation zone is operated at a pressure such as to limit the temperature in the column to no higher than 125° C.

4. A process as recited in claim 1 wherein the olefin which is epoxidized is propylene and the catalyst used to accomplish that purpose is a compound of molybdenum.

5. A process as recited in claim 1 wherein the alkylaromatic compound is cumene and the by-product is dimethyl phenyl carbinol.

6. A process as recited in claim 1 wherein the maximum temperature in the second distillation zone is 220° C.

7. A process as recited in claim 2 wherein the by-product, alpha phenyl ethanol, is subsequently dehydrated to form styrene.

8. A process as recited in claim 5 wherein the by-product dimethyl phenyl carbinol is dehydrated to form alpha methyl styrene.

References Cited

Chemical Absracts, vol. 64, p. 2052a, Halcon, January, 1966.

HENRY R. JILES, *Primary Examiner.*

S. WINTERS, *Assistant Examiner.*

U.S. Cl. X.R.

260—669